Nov. 19, 1929.  J. B. TRIPLETT  1,736,144
DRUM CONSTRUCTION
Filed Sept. 30, 1925   2 Sheets-Sheet 1
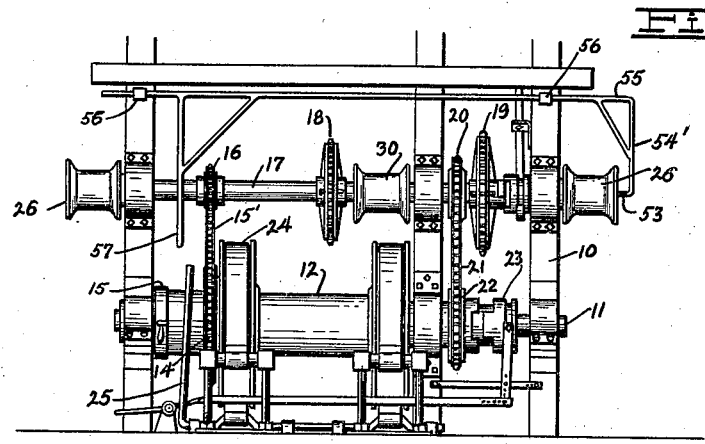
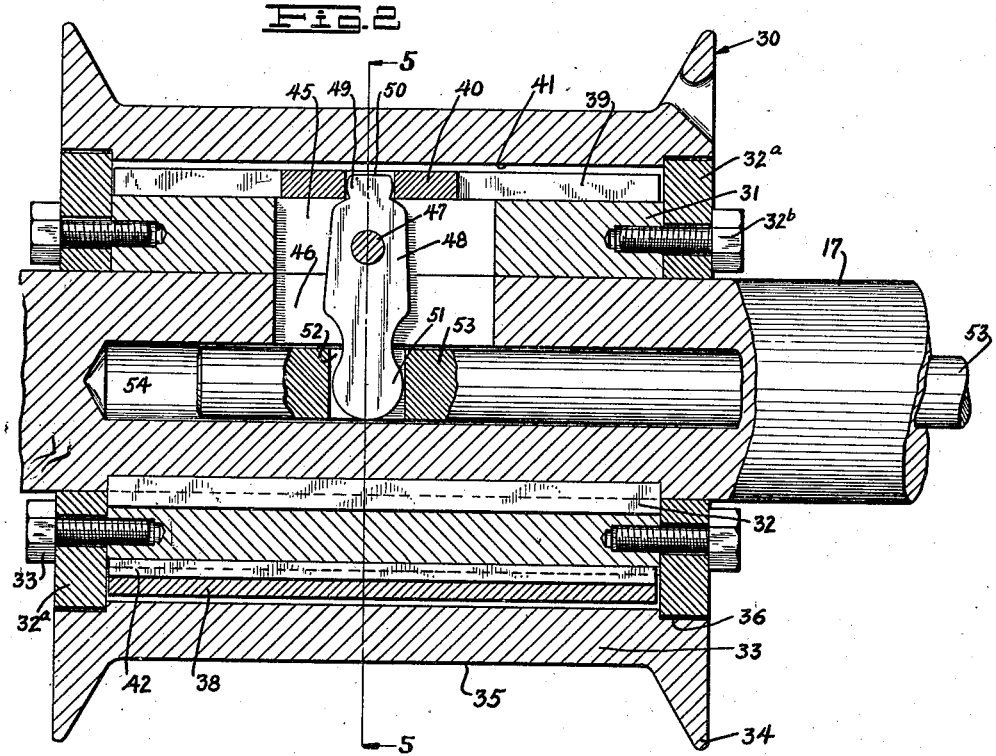
INVENTOR.
JAMES B. TRIPLETT
BY
ATTORNEY.

Nov. 19, 1929.  J. B. TRIPLETT  1,736,144
DRUM CONSTRUCTION
Filed Sept. 30, 1925   2 Sheets-Sheet 2
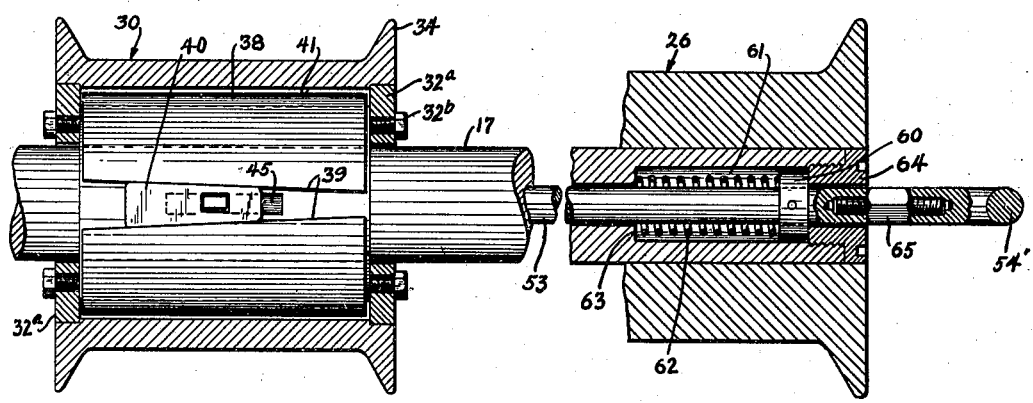
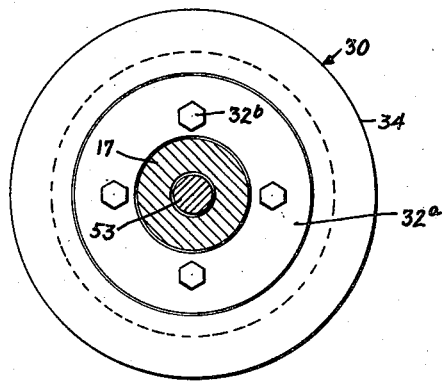
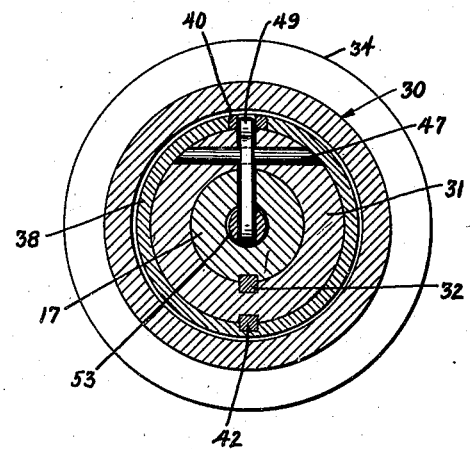
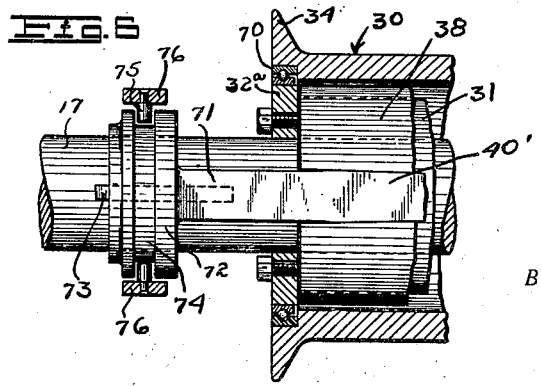
INVENTOR.
JAMES B. TRIPLETT
BY
ATTORNEY.

Patented Nov. 19, 1929

1,736,144

UNITED STATES PATENT OFFICE

JAMES B. TRIPLETT, OF LONG BEACH, CALIFORNIA

DRUM CONSTRUCTION

Application filed September 30, 1925. Serial No. 59,560.

This invention relates to earth boring machinery.

The general object of the invention is to provide an improved cat head for use in drilling machinery.

One of the specific objects of the invention is to provide a cat head which is provided with novel means for clutching it to the driving shaft.

Another object of the invention is to provide a cat head wherein an internal clutch is provided for actuating the cat head.

Another object of the invention is to provide a cat head wherein the control member for operating the cat head is arranged within the line shaft on which the cat head is mounted.

Other objects of the invention will be apparent from the following description taken in connection with the accompanying drawings wherein:

Fig. 1 is an elevation of a part of an earth boring machine showing my cat head applied thereto;

Fig. 2 is a central sectional view through a cat head embodying the features of my invention;

Fig. 3 is a view similar to Fig. 2 taken at right angles thereto;

Fig. 4 is an end view of the cat head;

Fig. 5 is a section on line 5—5, Fig. 2, and

Fig. 6 is a sectional view of a modification.

Referring to the drawing by reference characters, I have shown my invention as embodied in a portion of a drilling device including a frame 10 in which the draw works is mounted. The frame 10 includes a shaft 11 on which a hoisting drum 12 is mounted. The drum is adapted to be driven through a drum sprocket 14 which may be controlled by a clutch 15. The sprocket 14 is driven by a chain 15' which passes over a drum driving sprocket 16 mounted on a line shaft 17. The line shaft 17 has the engine sprocket 18 thereon and also the rotary drive sprocket 19. This shaft may be provided with a quick hoisting sprocket 20 which through a chain 21 will drive the sprocket 22 and the shaft 11 when a clutch 23 is operated. Suitable brake drums are provided as at 24. These are adapted to be operated through a control lever 25.

Mounted on each end of the line shaft 17 I show a cat head or auxiliary drum 26, and intermediate these cat heads I arrange another drum 30, embodying the features of my invention. I wish it to be understood, however, that the drum 30 may be placed at the ends of the shaft 17 or in any position other than that indicated. It is preferably placed adjacent the engine sprocket simply for the sake of convenience since its construction and uses do not limit its utility to any particular locality.

In the construction of drums of the type herein referred to it is essential that the drum be mounted so that it may remain stationary while the line shaft 17 is rotating and it is also necessary that provision be made for quickly and positively connecting and disconnecting the drum with the line shaft. The ability to afford positive operation is no more essential than the ability to give quick action and with my invention both requirements are satisfied.

My improved drum includes a bushing 31 which is connected on the shaft 17 by means of a key 32 as shown in Fig. 2. At each end of the bushing 31 I arrange a ring 32$^a$ which is held to the bushing by means of bolts 32$^b$ and 33. Upon the rings 32$^a$ I mount a drum 30 which includes the flanged end portions 34 and the cable receiving portion 35.

This drum is rabbeted at each end as at 36 to receive the rings 32$^a$. The middle portion of the drum 30 is spaced from the adjacent portion of the bushing 31 so that a split collar 38 may be mounted between these two portions. The split collar 38 has its adjacent faces 39 tapered with respect to each other as shown in Fig. 3. Between the tapered face of the collar 38 I arrange a wedge block 40, the opposite face of which corresponds to the tapered faces 39 and the construction is such that as the wedge 40 moves lengthwise in engagement with the faces 39 it will spread these faces thereby increasing the diameter of the collar 38 and causing it to tightly engage the inner cylindrical surface 41 of the drum 30.

The collar 38 is provided with a key 42 which fits in a keyway in the bushing 31 so that the collar is constrained to move with the bushing as the latter rotates with the line shaft 17. As a result, when the block 40 moves to operative position it will cause the drum to rotate with the shaft 17.

It is a well recognized fact that clutches such as I have described are quick and positive in their action and for this reason it will be apparent that a positive quick acting gripping action will be produced for controlling the rotation of the drum.

In order to move the block 40 I provide aligned slots 45 and 46 in the bushing 31 and in the line shaft 17. Within the slot 45 I mount a pin 47 and on this pin I pivot an operating dog 48 which has a head 49 thereon. The head 49 is preferably rounded at its side edges and fits in an aperture 50 in the block 40. The end 51 of the dog 48 is rounded and is fitted within a slot 52 which is arranged in a rod 53. This rod 53 is mounted in a central cylindrical bore 54 in the shaft 17, By locating the rod 53 within the line shaft 17 I overcome all difficulties which would be present if the operating member was disposed outside of this rod although it will be understood that the operating member may be otherwise located if desired.

In order to control the member 53 from the operator's position I provide a member 54' which is connected to the rod 53 as shown in Fig. 1. This member 54' is provided with a portion 55 which is supported to slide in hangers 56. This member 55 is provided with an operating portion 57 by which it can be grasped and moved to position. In order to provide means for normally holding the clutch in disengaged position I arrange a collar 60 on the rod 53. This collar moves in a recess 61 and engages one end of a spring 62 which has the other end engaging the end wall 63 of the recess. An apertured plug 64 which is threaded into the end of the shaft 17 holds the parts in assembled position. A coupling 65 may be used to couple the rod 53 to the member 54'.

From the foregoing description it will be apparent that when the operator wishes to throw the drum into action he will pull the member 57 to the left in Fig. 1 thereby moving the rod 53 to the left in Fig. 2 thus moving the block 40 to the right causing it to expand the collar 38 thereby locking the drum to the shaft. When he wishes to release the drum he will release the member 57 and the parts will at once disengage.

In the modified form of my invention shown in Fig. 6 the shaft 17, the split collar 38 and the collar 32ª are of a construction similar to the preferred embodiment. On the collar 32ª I mount a ball race 70 which supports the drum 30 so that this drum may rotate freely on the collar 32ª. In Fig. 6 I also show another means for operating the clutch. This means includes a wedge block 40' which is adapted to engage the opposed faces of the collar 38. This wedge block 40' has tapered sides thereon and is provided with an extension 71 which is secured to a sleeve 72. The sleeve 72 is splined to the shaft at 73 so that the sleeve 72 is compelled to rotate with the shaft 17.

The sleeve 72 is provided with a groove 74 therein which receives pins 75 mounted on a yoke 76. As the yoke is moved longitudinally along the shaft 17 the collar 72 will be moved and thus the wedge member 40' will be moved to actuate the clutch.

Having thus described my invention, I claim:

1. In a device of the class described, a line shaft having an aperture therein, means to drive said line shaft, a drum mounted to rotate freely about the line shaft, means within the drum to clutch the drum to the line shaft, said clutch means comprising a split collar, means in said aperture for controlling the first mentioned means, said controlling means comprising a member engaging the edges of the split collar and movable longitudinally along the collar to expand the same.

2. In a device of the class described, a line shaft, a bushing fixed thereon, a drum mounted to rotate about the bushing, means within the drum for clutching the drum to the bushing, and means to operate the clutching means, said last mentioned means including an actuating member engaging said clutching means and rotatable with said shaft and bushing, a longitudinally movable member disposed within the line shaft and operatively engaging said actuating member, means to normally urge the clutch to inoperative position and an operating member connected to said actuating member and shiftable to move the clutching means to active position.

3. In a device of the class described, a supporting frame having a shaft thereon, means to drive said shaft, a bushing keyed on said shaft, a pair of end rings, one at each end of said bushing, a drum mounted to rotate on said rings, and a clutch mounted within said drum, said clutch including a split collar, and said collar being keyed to said bushing and means to expand said collar.

4. In a device of the class described, a supporting frame having a shaft thereon, means to drive said shaft, a bushing keyed on said shaft, a pair of end rings, one at each end of said bushing, a drum mounted to rotate on said rings, and a clutch mounted within said drum, said clutch including a split collar, said collar being keyed to said bushing and means to expand said collar, and said means comprising a member movable between the opposed faces of said collar.

5. In a device of the class described, a supporting frame having a shaft thereon, means to drive said shaft, a bushing keyed on said shaft, a pair of end rings, one at each end of said bushing, a drum mounted to rotate on said rings, a clutch mounted within said drum, said clutch including a split collar, said collar being keyed to said bushing, means to expand said collar, said means comprising a wedge shaped metal member movable between the opposed faces of said collar, said member having a hole therein, means to move said member, said last mentioned means including a pivoted dog mounted on said bushing, said dog having a rounded portion at one end thereof, said shaft being hollow, and a rod mounted to move in said shaft, said rod having an aperture therein, and said aperture fitting said rounded portion of said dog whereby movement of said rod will rock said dog to thereby operate the clutch.

6. In a device of the class described, a supporting frame having a line shaft thereon, a bushing keyed to said line shaft, a pair of annular collars one at each end of said bushing, a drum rotatably mounted on said collars, said drum having a cylindrical inner surface spaced from the surface of said bushings, a split collar arranged between the drum and the bushing, said split collar having inclined opposed faces, a wedge block having inclined faces, said block being slidable along said bushing, said split collar being keyed to said bushing, and means to move said block, said means including a dog, a shaft mounted on said bushing, said dog being pivoted to said last mentioned shaft, said line shaft having a central aperture therein, an operating rod movable in said aperture, said rod having a hole therein and said dog having a part thereof fitting in said hole and means to move said rod, said means including an operating member having a portion thereon mounted on the frame and a handle for moving the operating member.

In testimony whereof, I hereunto affix my signature.

JAMES B. TRIPLETT.